US009483646B2

(12) United States Patent
Eren et al.

(10) Patent No.: US 9,483,646 B2
(45) Date of Patent: Nov. 1, 2016

(54) DATA EXFILTRATION PREVENTION FROM MOBILE PLATFORMS

(71) Applicant: Remotium, Inc., San Mateo, CA (US)

(72) Inventors: Sinan Eren, Republic of Turkey (TR); Asim Utku Zihnioglu, Republic of Turkey (TR); Pablo German Sole, Argentine Republic (AR); Jose Luis Ferras Pereira, Portuguese Republic (PT)

(73) Assignee: REMOTIUM, INC., San Mateo, CA (US)

( * ) Notice: Subject to any disclaimer, the term of this patent is extended or adjusted under 35 U.S.C. 154(b) by 0 days.

(21) Appl. No.: 14/470,181

(22) Filed: Aug. 27, 2014

(65) Prior Publication Data

US 2015/0082456 A1    Mar. 19, 2015

Related U.S. Application Data

(60) Provisional application No. 61/880,076, filed on Sep. 19, 2013.

(51) Int. Cl.
*H04W 4/02* (2009.01)
*H04W 12/02* (2009.01)
*G06F 21/57* (2013.01)

(52) U.S. Cl.
CPC .............. *G06F 21/57* (2013.01); *H04W 12/02* (2013.01); *G06F 2221/2111* (2013.01); *H04W 4/02* (2013.01)

(58) Field of Classification Search
CPC .................................................. H04W 12/02
USPC ......................................................... 726/27
See application file for complete search history.

(56) References Cited

U.S. PATENT DOCUMENTS

| 8,966,632 B1* | 2/2015 | Huang .................. G06F 21/566 713/183 |
| 9,183,189 B1* | 11/2015 | Thakare .............. G06F 17/2252 |
| 2006/0212714 A1* | 9/2006 | Ting ........................ G06F 21/10 713/182 |
| 2013/0007216 A1* | 1/2013 | Fries ...................... G06F 9/4856 709/218 |
| 2013/0042115 A1* | 2/2013 | Sweet ................. H04L 63/0428 713/176 |
| 2013/0145366 A1* | 6/2013 | Newell ................. G06F 3/0484 718/1 |
| 2013/0159392 A1* | 6/2013 | Huh ....................... G06F 9/5072 709/203 |
| 2014/0020062 A1* | 1/2014 | Tumula ................. H04W 12/08 726/3 |
| 2014/0164750 A1* | 6/2014 | Tang ................... G06F 9/45558 713/1 |

* cited by examiner

*Primary Examiner* — Andrew Nalven
*Assistant Examiner* — Khang Do
(74) *Attorney, Agent, or Firm* — Husch Blackwell LLP

(57) ABSTRACT

Technology is disclosed for preventing an exfiltration of a data associated with an application executing on a mobile device. The technology can migrate the application from a computing platform of the mobile device to a secure computing platform, where the secure computing platform is independent of the computing platform of the mobile device. The technology can further receive a request to access the application through the mobile device, execute the requested application on the secure computing platform, and provide an access to the requested application executing on the secure computing platform through the mobile device. The access provided through the mobile device includes displaying information on the mobile device, where the displayed information includes data generated by the execution of requested application on the secure platform.

42 Claims, 9 Drawing Sheets

DATA EXFILTRATION PREVENTION FROM MOBILE PLATFORMS

CROSS-REFERENCE TO RELATED APPLICATIONS AND EFFECTIVE FILING DATE ENTITLEMENT

This patent application is entitled to the benefit of and/or the right of priority to U.S. Provisional Application No. 61/880,076, titled, "PREVENTION OF DATA EXFILTRATION FROM MOBILE PLATFORMS", filed Sep. 19, 2013, which is hereby incorporated by reference in its entirety for all purposes. This patent application is therefore entitled to an effective filing date of Sep. 19, 2013.

TECHNICAL FIELD

This patent application generally relates to data security, and more specifically to preventing data exfiltration from mobile devices by utilizing an off-device virtualization environment.

BACKGROUND

The Background section of this document is provided to place embodiments of the disclosed technology in technological and operational context to assist those of skill in the art in understanding their scope and utility. Unless explicitly identified as such, no statement herein is admitted to be prior art merely by its inclusion in the Background section.

Applications running on mobile devices consume and store confidential information from various network-enabled resources, e.g., web servers, databases, etc., while generating privacy sensitive data from various built-in sensors, e.g., images generated using cameras, location information generated using Global Positioning Systems (GPS), etc. To protect such confidential information, the mobile devices implement various security features, preventing the data associated with applications from being accessed out-of-band. Further, to enhance security, mobile device manufacturers restrict their devices to a single online repository for installing new applications, where the applications are validated and authorized before becoming available through the online repository.

However, due to defects and vulnerabilities in the mobile platforms of these mobile devices, mobile device users are able to introduce arbitrary executable code that can disable many of the security features. For instance, an attacker can successfully penetrate a mobile operating system without modifying the state of the target application. As a non-limiting example, an attacker may utilize a method known as jail-breaking to obtain high-level system privileges on the target mobile device by leveraging the system's debugging interface, which in turn allows complete access to the memory and disk resources of the applications executing on the target mobile device.

In another non-limiting example of defects and vulnerabilities in the mobile platforms, as part of a device tracking feature, mobile devices generally provide mobile applications with access to granular location information by means of an onboard GPS chipsets and coarse location information based on proximity to telecom base stations and known wifi stations. There are known systems and methods that periodically updates a remote server with the location of the mobile device as a means to track its last known location, helping provide a remedy for lost or stolen devices. However, applications for tracking the location of lost or stolen devices are highly limited and can be rendered ineffective by disturbing and/or preventing network connectivity or GPS access to the mobile device.

In another non-limiting example, a device remote wipe feature can remotely trigger a factory reset operation, where all user generated data and settings are erased from the device. Such technology can also be rendered ineffective by disturbing and/or preventing network connectivity of the mobile device before a wipe command could be sent to the device.

In another non-limiting example, persistent storage encryption is the concept where the data is encrypted while it is not actively processed by an application. Such technology can be attacked through the software stack as described above and cannot be extended to protect data while it is being processed.

In another non-limiting example of defects and vulnerabilities in the mobile platforms, containers and wrappers are systems and methods that build additional layers of access control over applications, where data and sensor access is controlled by a policy. Such technology can be attacked through the software stack as described above and cannot be extended to protect data while it is being processed.

In another non-limiting example, network layer solutions are systems and methods that intercept network traffic between mobile devices and private networks detecting known application traffic and enforces predefined policies to such traffic. These systems and methods cannot be extended to protect data when the said data is transferred over a previously unknown method or system, e.g. locally encrypting and posting a sensitive file to an unknown web site.

In another non-limiting example, HTML5 based mobile applications are systems and methods that process and present sensitive data in a web structured format within web client technologies. Such technology is generally limited in functionality compared to native applications and is susceptible to Man-In-The-Browser and Advanced-Persistent-Threat attacks.

Further, the security problems are becoming much more prevalent due to many organizations allowing their employees to access sensitive corporate data through their mobile devices. This phenomenon is referred to as the Bring Your Own Device trend, commonly abbreviated as BYOD. So, with the increasing complexity of new mobile platforms and the new device usage trend, the possibility of sensitive application data being accessed out-of-band becomes much more likely in spite of the various efforts to improve mobile computing security.

BRIEF DESCRIPTION OF THE DRAWINGS

The techniques introduced here may be better understood by referring to the following Detailed Description in conjunction with the accompanying drawings, in which identical reference numerals indicate identical or functionally similar elements.

Figure 1:
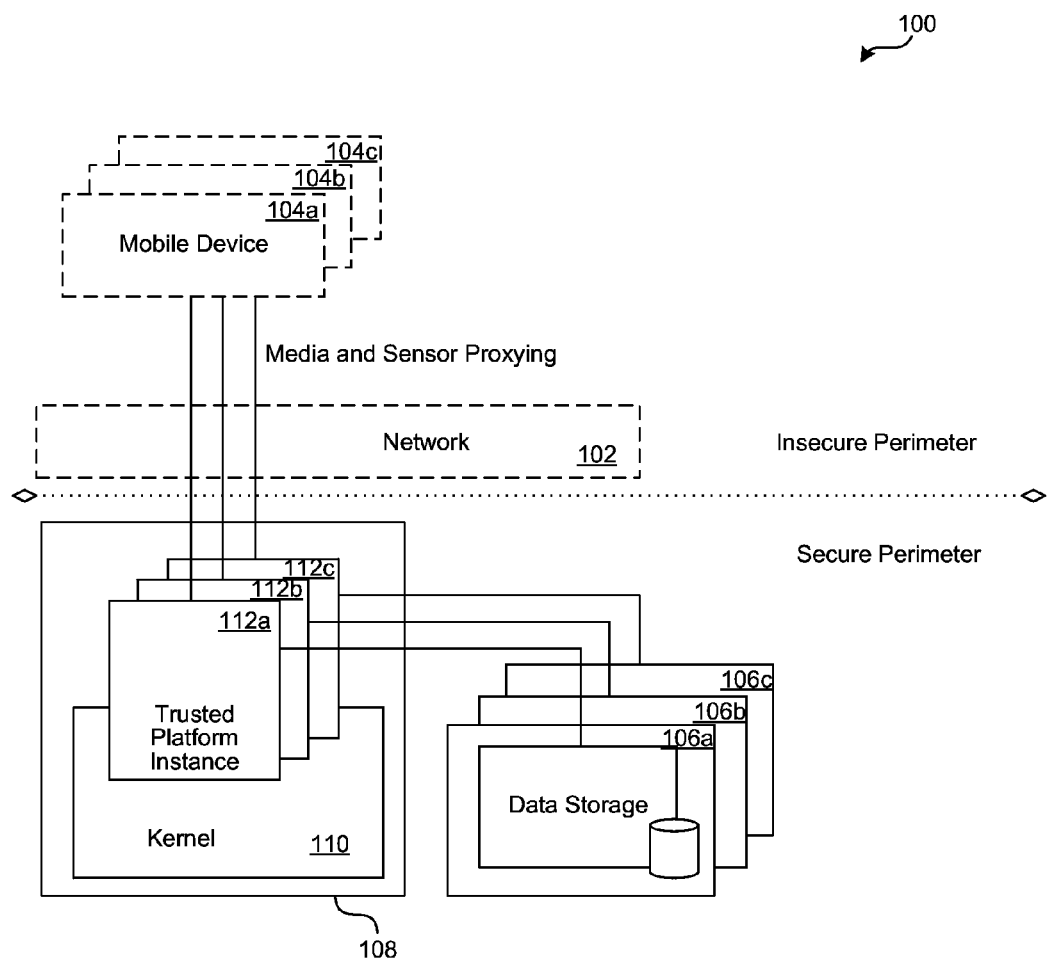
FIG. 1 provides a high-level overview of a distributed processing environment ("environment"), where the Trusted Mobile Platform ("TMP") hosts one or more Trusted Mobile Instances ("TMI") within a secure perimeter.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Overview

A data exfiltration prevention system is disclosed for providing data security to the data accessible through a mobile computing device. In various embodiments, the disclosed technology considers the data stored in a mobile computing device as being outside a secure perimeter and subjects the data to exfiltration. The disclosed technology utilizes a secure perimeter as a trusted component of a distributed processing environment, where the secure perimeter includes proper logical and physical security procedures to protect the data within the perimeter.

To prevent exfiltration of data, in some embodiments, the disclosed technology migrates applications present in a mobile computing device to a secure perimeter. In some embodiments, the disclosed technology utilizes an application migration process to migrate the applications present in the mobile computing device to the secure perimeter and execute the applications within the secure perimeter. In some embodiments, the migration process includes providing access to a Trusted Mobile Platform ("TMP") that resides within the secure perimeter to execute the applications, where the TMP acts as an alternative to the mobile computing platform of the mobile computing device.

The migration process further includes deploying and running a Trusted Mobile Instance ("TMI") on the TMP, where the TMI includes a Trusted Mobile Runtime ("TMR") to execute the mobile applications. In some embodiments, the TMI (also referred to as a "sandbox") provides a tightly controlled set of resources, e.g., space on disk and memory, CPU cycles, etc., for applications to run in. Further, the TMI restricts the network access, the ability to inspect the TMP, read from input devices, etc., of the processes and applications running inside the TMI.

The migration process further includes providing access to the TMR using an encrypted remote display technology, where the applications executing on the TMR can be remotely viewed through the mobile device. In some embodiments, the disclosed technology may proxy back the visual components of the TMP to the mobile computing device residing outside of the secure perimeter while proxying the input from various sensors of the mobile device. Such an execution of the application in the distributed processing environment in turn allows the computation of data to be carried out within the secure perimeter, helping overcome some of the inherent flaws of currently known techniques described above.

General Description

Various examples of the techniques introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Several embodiments of the disclosed data exfiltration prevention system is described in more detail in reference to the Figures. Turning now to Figures, FIG. 1 is a block diagram illustrating a distributed processing environment ("environment"). Although not required, aspects of the technology may be described below in the general context of computer-executable instructions, such as routines executed by a general-purpose data processing device (e.g., a server computer or a personal computer). Those skilled in the relevant art will appreciate that the technology can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems.

While aspects of the technology, such as certain functions, are described as being performed exclusively on a single device, the technology can also be practiced in distributed environments where functions or modules are shared among disparate processing devices. The disparate processing devices are linked through a communications network, such as a Local Area Network (LAN), Wide Area Network (WAN), or the Internet. In a distributed computing environment, program modules may be located in both local and remote memory storage devices.

Aspects of the technology may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data related to the technology may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

In the representative environment shown in FIG. 1, a user may use a personal computing device (e.g., a mobile device 104a-104c) to communicate with a network 102. The term "mobile device," as used herein, may include a smart phone (e.g., an Apple iPhone®), a personal digital assistant (PDA), a portable media player (e.g., an IPod Touch®), a tablet device (e.g., an iPad®), a personal computer (e.g., a laptop, notebook, or desktop computer), or any other device having communication capability to connect to the network 102. In one example, the mobile device 104a-104c connects using one or more cellular transceivers or base station antennas (in cellular implementations), access points, terminal adapters, routers or modems (in IP-based telecommunications implementations), or combinations of the foregoing (in converged network embodiments).

In some embodiments, the network 102 may be the Internet, allowing the mobile device 104a-104c (with, for example, WiFi capability) to access a computing server hosting the TMP 108. It should be noted that one or more computing servers can together host the TMP 108 in a distributed manner. Hence, the disclosed technology should not be considered limited to an environment where the TMP 108 is hosted by a particular computing server and any description of utilizing a particular computing server to host the TMP 108 is intended for discussion purposes only.

In some embodiments, where the mobile device 104a-104c is used to communicate through the network 102 (e.g., when a 3G or an LTE service of the mobile device 104a-104c is used to connect to the network 102), the network 102 may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), Wi-Fi, etc.

In FIG. 1, the network 102 and mobile device 104a-104c form an untrusted portion of the environment while the secure computing platform (also referred to as the "Trusted Computing Base") including the TMP 108 and the data storage servers 106a-106c that store the persistent data together form the trusted portion (also referred to as "secure perimeter") of the environment. The data storage servers 106a-106c can include hard disk drives, flash drives, network attached storage or other well-known persistent storage devices to store data.

In some embodiments, the TMP 108 hosts one or more TMI 112a-112c, where a given TMI 112a-112c is a kernel-level isolated group of processes and data-related resources. The kernel 110 associated with the TMP 108 is shared by the one or more TMI 112a-112c hosted by the TMP 108. As discussed above, in some embodiments, the TMP 108 acts as an alternate platform to the mobile computing platform, providing an Operating System ("OS"), related software services, and hardware resources to execute the applications running through the TMI 112a-112c. In some embodiments, the number of TMI 112a-112c hosted by the TMP 108 is linearly correlated with the available resources (e.g., Memory, CPU, available instruction set extensions, etc.) across the one or more computing servers hosting the TMP 108.

In some embodiments, each TMI 112a-112c may be associated with a particular mobile device 104a-104c, where the applications and processes associated with the particular mobile device 104a-104c are executed on the TMP 108 through the associated TMI 112a-112c. In some embodiments, a TMI 112a-112c may be associated with two or more mobile devices 104a-104c, where applications and processes associated with the two or more mobile devices 104a-104c are executed on the TMP 108 through the associated TMI 112a-112c. In some embodiments, two or more TMI 112a-112c may be associated with a particular mobile device 104a-104c, where the applications and processes associated with the particular mobile device 104a-104c are executed on the TMP 108 through one of the two or more TMI 112a-112c associated with the particular mobile device 104a-104c.

Further, each TMI 112a-112c may include a corresponding TMR (not shown in FIG. 1) to execute the applications. As discussed above, in some embodiments, the TMI (also referred to as a "sandbox") provides a tightly controlled set of resources, e.g., space on disk and memory, CPU cycles, etc., for applications to run in. The TMI 112a-112c also restricts the network access, the ability to inspect the TMP 108, read from input devices, etc., of the processes and applications running inside the TMI 112a-112c. In some embodiments, each TMI 112a-112c is completely isolated from each other, preventing any kind of interaction between them while running on the same OS Kernel. The isolation includes restricting operations related to file system, OS tasks, memory, Inter-Process Communication (IPC), network access, etc.

In some embodiments, the disclosed technology utilizes a Media and Sensor Proxying protocol ("network stream protocol") to enable a mobile device 104a-104c to securely access an associated TMI 112a-112c remotely across the network 102. Further, the network stream protocol, an extended remote display technology, can be utilized to seamlessly transmit media components, e.g., audio, video, etc., of the isolated application, executing in the associated TMI 112a-112c, to the mobile device 104a-104c.

In some embodiments, based on a given application's requirements and administrative decisions, the disclosed technology utilizes the network stream protocol to proxy device sensors and input devices on the mobile device 104a-104c, e.g., onboard GPS, camera, keyboard, touch presses, etc., back to the mobile application (and the associated TMR) executing on the TMI 112a-112c. The mobile application can utilize and control the various device sensors and input devices on the mobile device using the network stream protocol through the network 102.

For example, a mobile application requiring the GPS location of the mobile device 104a-104c can communicate using the network stream protocol with the onboard GPS module on the mobile device 104a-104c to determine the GPS location. In another example, using the disclosed technology, a mobile application requiring a user feedback can enable a user of the mobile device 104a-104c to provide feedback using a keyboard associated with the mobile device 104a-104c, where the input provided through the keyboard are gathered using the network stream protocol.

Figure 2:
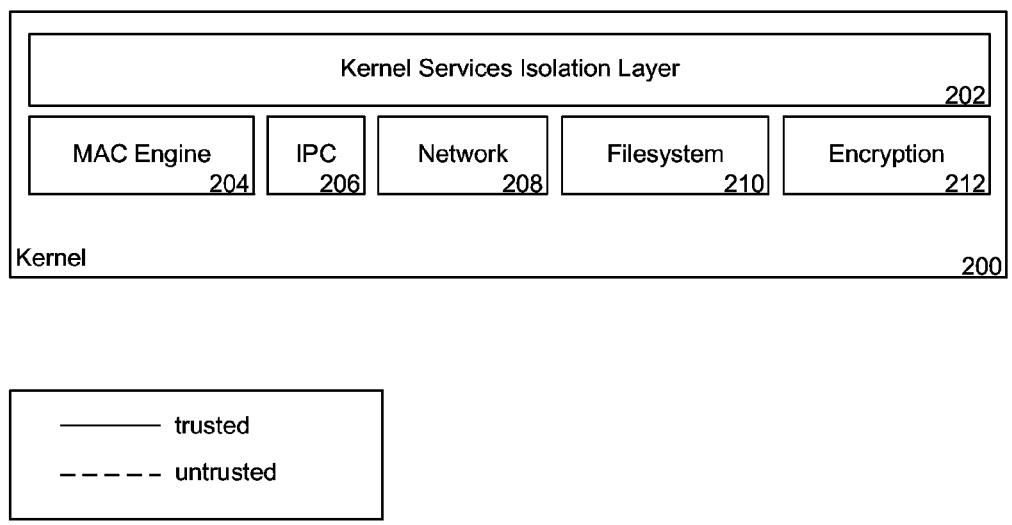
FIG. 2 is an illustrative example of an OS kernel of a TMP, which enables sharing of the TMP associated system resources across the various TMI while providing a set of security APIs to ensure a proper isolation between the various TMI.

Turning to FIG. 2, FIG. 2 is an illustrative example of an OS kernel 200 of a TMP 108, which enables sharing of the TMP 108 associated system resources across the various TMI 112a-112c while providing a set of security APIs to ensure a proper isolation between the TMI 112a-112c. In some embodiments, the kernel 200 running within the secure perimeter enables the various mobile applications executing on the TMI 112a-112c to be network filtered, user/group level access controlled, finer-grained logging, limited access to IO resources, etc.

In some embodiments, the kernel 200 includes a Kernel Services Isolation Layer ("KSIL") 202 that manages the context switching between the different TMI 112a-112c for the available resources. In some embodiments, the OS Kernel 200 is shared among the various TMI 112a-112c by means of a KSIL 202 that intermediates between the various processes executing within the TMI 112a-112c and the various kernel 200 provided services. The KSIL 202 manages the access requests to the kernel 200 provided services such that a process executing within the TMI 112a-112c can only access its own resources.

In some embodiments, the KSIL 202 applies quotas to limited resources, e.g., data storage servers 106a-106c, network bandwidth 102, CPU, memory utilization, etc., such that the resource usage by the various TMI 112a-112c can be constrained to their respective allocated quota. Such allocation of quota will also guarantee that a single TMI 112a-112c cannot take over the resources of the complete TMP 108, effectively mounting a Denial of Service attack. In some embodiments, the OS Kernel 200 includes a Mandatory Access Control ("MAC") engine 204 that provides a centralized means for access control of the various processes executing within a given TMI 112a-112c. Further, the MAC engine 204 cannot be altered or tampered by a process executing within the TMI 200 as such a process lacks the access privilege to interface with the MAC engine.

In some embodiments, the MAC engine 204 manages the rules that are applied to all processes executing within a given TMI 112a-112c. The applied rules include rules to control which processes are allowed to access what resources. These resources have different identification methods depending on their type. As a non-limiting example, the MAC engine 204 may identify the various processes by a user ID ("UID") or group ID ("GID") of the associated user or by the path and filename that backs a given process's binary code on disk. The resources controlled by the MAC engine 204 include Network 208, Filesystem 210, IPC 206, Encryption 212, etc.

In some embodiments, the data stored in the data storage servers 106a-106c is encrypted at-rest using state-of-the-art cryptographic methods, where the stored data includes data generated by mobile applications associated with the mobile device 104a-104c. In some embodiments, the KSIL 200 isolates access to the data storage servers 106a-106c such that each TMI 112a-112c can access only data associated with applications executing within itself. Further, due to the virtualized nature of the TMI 112a-112c, data storage servers 106a-106c can be either physically present in the same host or over the network inside the secure perimeter.

Figure 3:
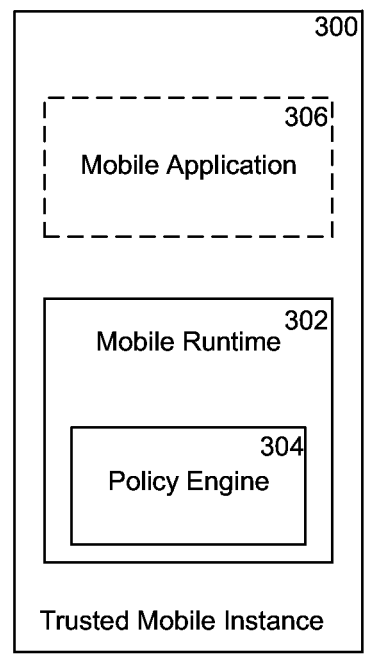
FIG. 3 is an illustrative example of a TMI.
Figure 3:
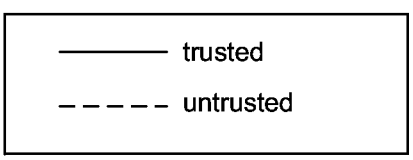

Turning now to FIG. 3, FIG. 3 is an illustrative example of a Trusted Mobile Instance 300 ("TMI"). As discussed above, the various processes (including the mobile application 306) executing within the TMI 300 cannot directly access the TMP 108 resources nor the resources provisioned for the other TMI 300. In some embodiments, the TMI 300 includes a policy engine 304, which controls policies that are applied on a per-TMI 300 basis. The policies are utilized to mediate access to a mobile runtime service, e.g., communication between processes, accessing data, etc.

In some embodiments, the TMI 300 further include a Trusted Mobile Runtime ("TMR") 302, where the TMR 302 includes the mobile applications' core system libraries. A library is portion of computer readable code that is typically used in common by several applications. In some embodiments, the libraries are extended such that the access to IO devices required by the mobile application 306 executing through the TMI 300 can either be forwarded to the TMI 300 for certain IO devices, e.g., storage, networking, etc., or intelligently proxied back to the mobile device 104a-104c for certain IO devices, e.g., keyboard, touch, GPS events, etc., through the network stream protocol.

In FIG. 3, the mobile application 306 represents a hosted application running on one of the previously spawned TMI 300, where the mobile application 306 could be an untrusted, unmodified mobile application. In some embodiments, the disclosed technology utilizes the TMR 302 as being part of the secure platform that is non-malicious and behaves according to specifications. The disclosed technology further includes policy and security measures that monitor and control the resource usage of the hosted mobile applications 306 to provide data security. In some embodiments, the TMP 108 implements various well-known security layers to prevent the TMR 302 from being modified or tampered by any unauthorized processes.

Figure 4:
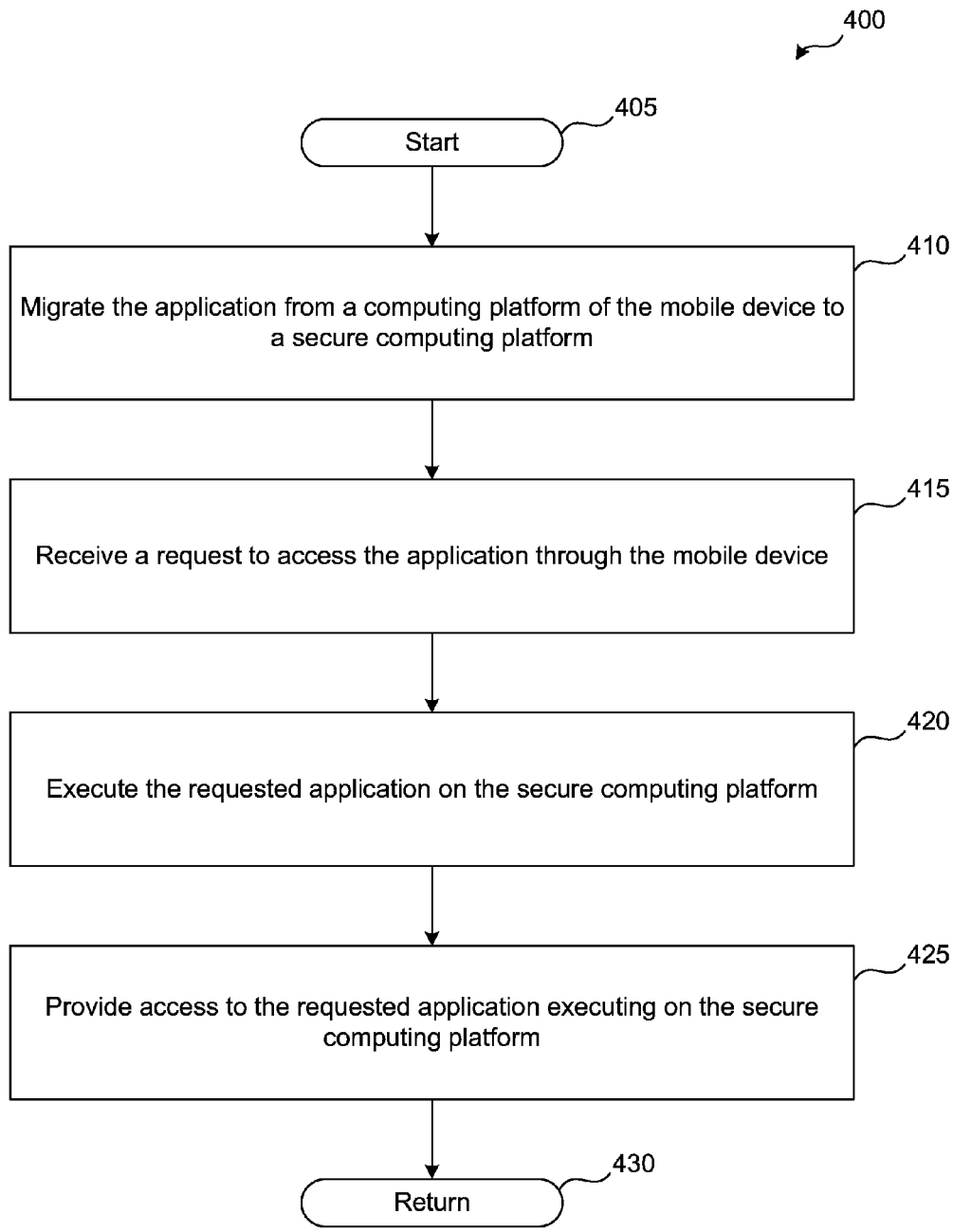
FIG. 4 is a flow chart of a method to prevent an exfiltration of data associated with an application from a mobile device in a distributed processing environment.

Turning now to FIG. 4, FIG. 4 is a flow chart of an example method 400 to prevent an exfiltration of data associated with an application from a mobile device 104a-104c in the distributed processing environment 100. In some embodiments, the method 400 is implemented by the TMP 108. The method starts at block 405. At block 410, an application (e.g., mobile application 306) accessible on a computing platform of the mobile device is migrated to a secure computing platform associated with the TMP 108, where the secure computing platform is independent of the computing platform of the mobile device 104a-104c.

At block 415, a request to access the application is received through the mobile device 104a-104c. At block 420, the requested application is executed on the secure computing platform. At block 425, access to the requested application executing on the secure computing platform is provided by displaying information on the mobile device 104a-104c using data generated by the execution of requested application on the secure computing platform.

As discussed above, in some embodiments, access to the application is provided using an encrypted remote display technology, where the applications executing on the secure computing platform can be remotely viewed through the mobile device. Such an execution of the application in the distributed processing environment 100 in turn allows the computation of data to be carried out within the secure computing platform, helping prevent the exfiltration of data associated with the application from the mobile device 104a-104c in the distributed processing environment 100.

The method returns at block 430. Those skilled in the art will appreciate that the logic illustrated in FIG. 4 and described above, and in each of the flow diagrams discussed below, may be altered in various ways. For example, the order of the logic may be rearranged, substeps may be performed in parallel, illustrated logic may be omitted, other logic may be included, etc.

Figure 5:
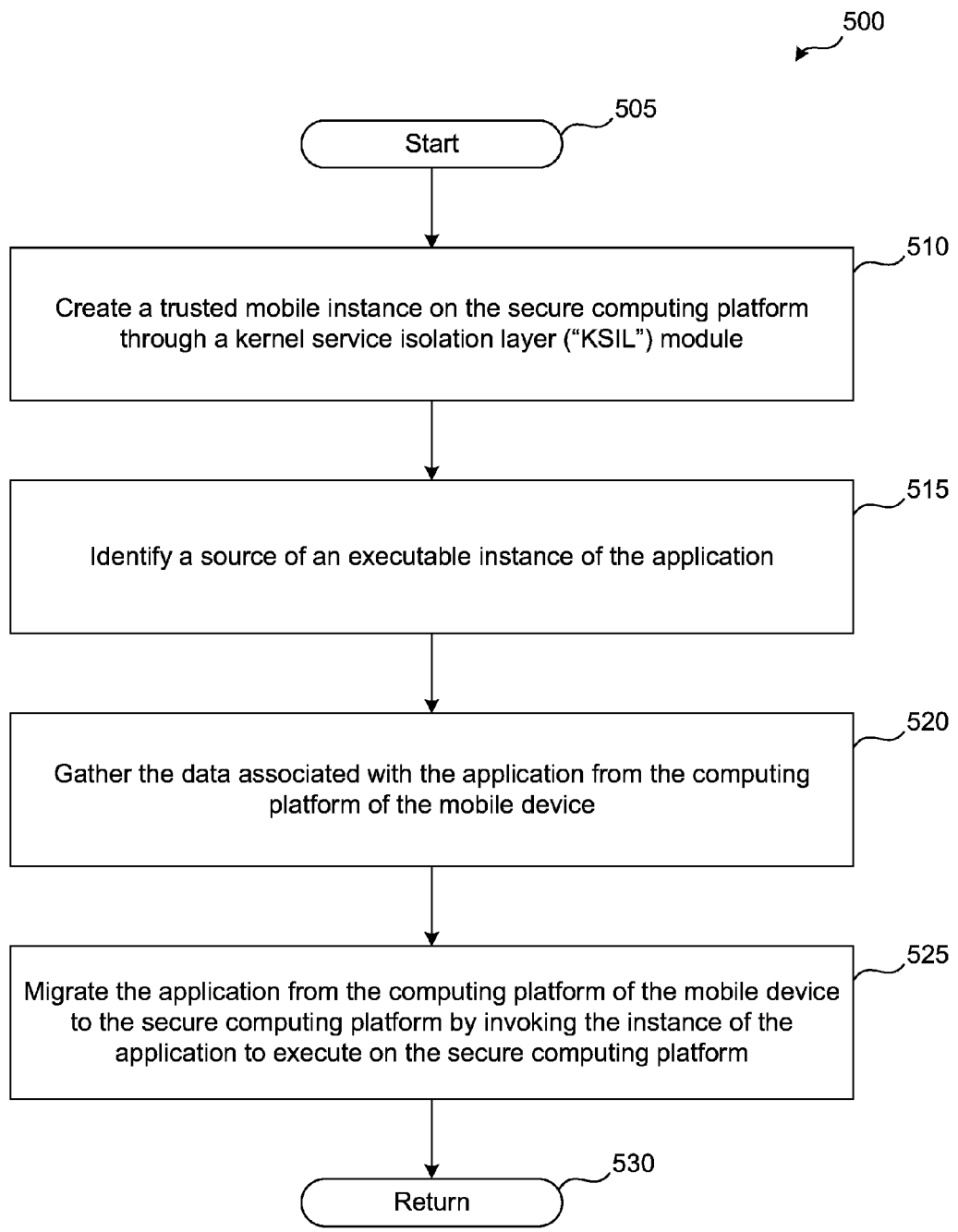
FIG. 5 is a flow chart of an example method for migrating an application from a computing platform of a mobile device to a secure computing platform in the distributed processing environment.

Turning now to FIG. 5, FIG. 5 is a flow chart of an example method 500 for migrating an application from a computing platform of a mobile device 104a-104c to a secure computing platform in the distributed processing environment 100. In some embodiments, the method 500 is implemented by the TMP 108. The method starts at block 505. At block 510, a TMI 112a-112c is created/spawned on the secure computing platform or TMP 108 through the KSIL module 202.

As discussed above, the KSIL module 202 is an intermediary layer between a given TMI 112a-112c and a OS kernel 200 of the secure computing platform. The KSIL module 202 manages one or more service requests from multiple TMI 112a-112c to the kernel 200 for system resource, where the kernel 200 provides access to the system resources of the secure computing platform.

At block 515, a source of an executable instance of the application is identified, where the identified source is utilized to invoke an instance of the application to execute the application on the secure computing platform. At block 520, the data associated with the application is gathered from the computing platform of the mobile device 104a-104c, where the gathered data is utilized by the invoked instance of the application executing on the secure platform.

At block 525, the application is migrated from the computing platform of the mobile device 104a-104c to the secure computing platform by invoking the instance of the application to execute on the secure platform, where the invoked instance of the application executes on the secure computing platform through the TMI 112a-112c. The method returns at block 530.

Figure 6:
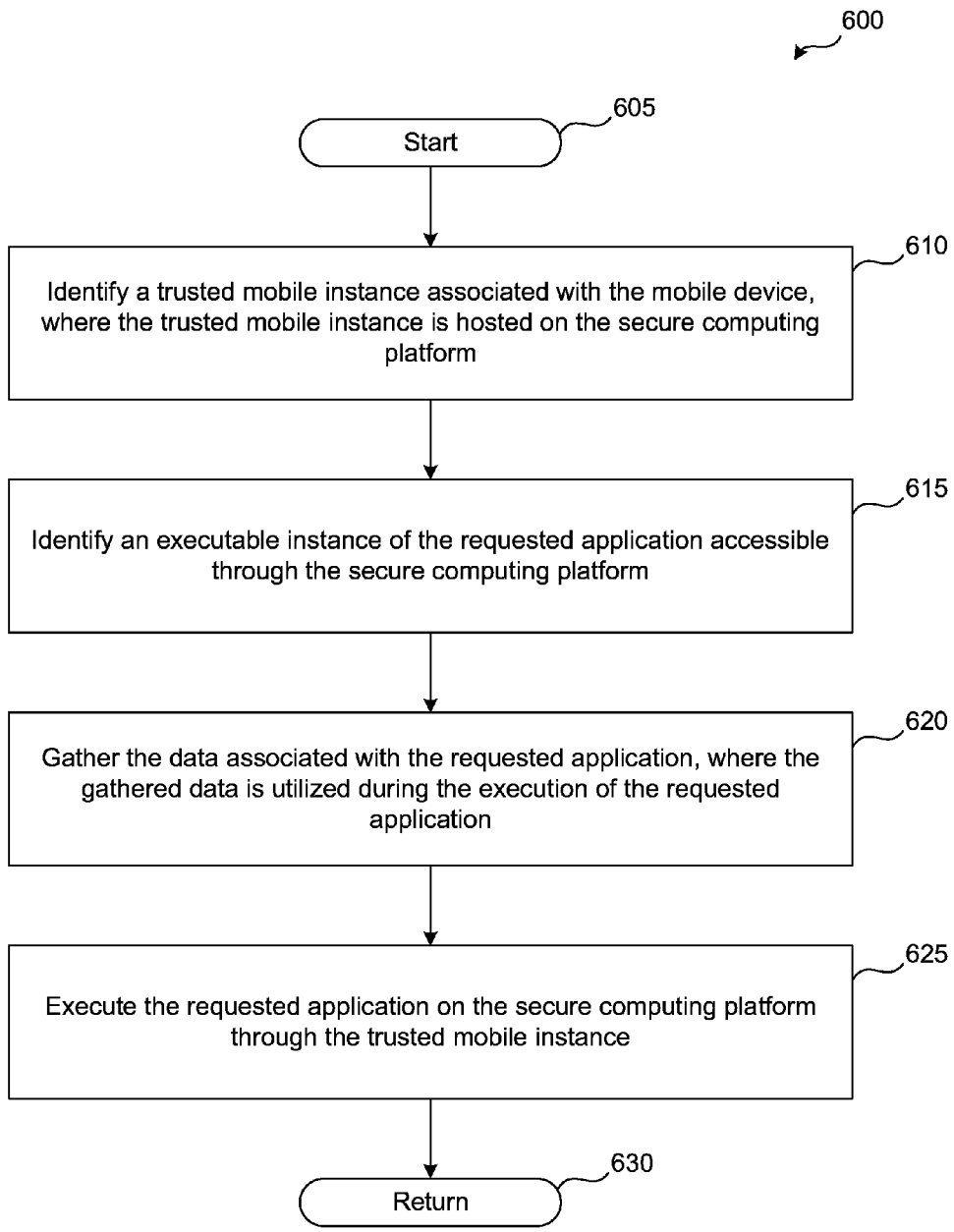
FIG. 6 is a flow chart of an example method for executing the requested application on the secure computing platform in the distributed processing environment.

Turning now to FIG. 6, FIG. 6 is a flow chart of an example method 600 for executing the requested application on the secure computing platform in the distributed processing environment 100. In some embodiments, the method 600 is implemented by the TMP 108. The method starts at block 605. At block 610, a TMI 112a-112c associated with the mobile device is identified, where the TMI 112a-112c is hosted on the secure computing platform. The TMI 112a-112c utilizes the resource accessible through the secure computing platform to execute a given application associated with the mobile device 104a-104c.

At block 615, an executable instance of the requested application accessible through the secure computing platform is identified. For example, the executable instance can be accessed from an application repository associated with the user of the mobile device 104a-104c. At block 620, the data associated with the requested application is gathered, where the gathered data is utilized during the execution of the requested application.

In method 600, gathering the data associated with the requested application includes identifying data associated with the requested application in the data storage 106a-106c; receiving a user input from a user of the mobile device 104a-104c, where the received user input is provided using an input device associated with the mobile device 104a-104c; receiving sensory input data from one or more sensors on the mobile device 104a-104c, where the received sensory input is utilized during the execution of the requested application; and gathering the identified data, the received user input and the sensory input as the data associated with the requested application.

The sensors on the mobile device 104a-104c may include but are not limited to, a GPS module, a wireless communication module, a compass, a temperature sensor, a proximity sensor, an accelerometer, and a gyroscope. The input device on the mobile device 104a-104c may include, but are not limited to, a touch screen, a keyboard, a microphone, and a camera. At block 625, the requested application is executed on the secure computing platform through the TMI 112a-112c, where the requested application is executed by utilizing the identified executable instance of the requested application and the gathered data. The method returns at block 630.

Figure 7:
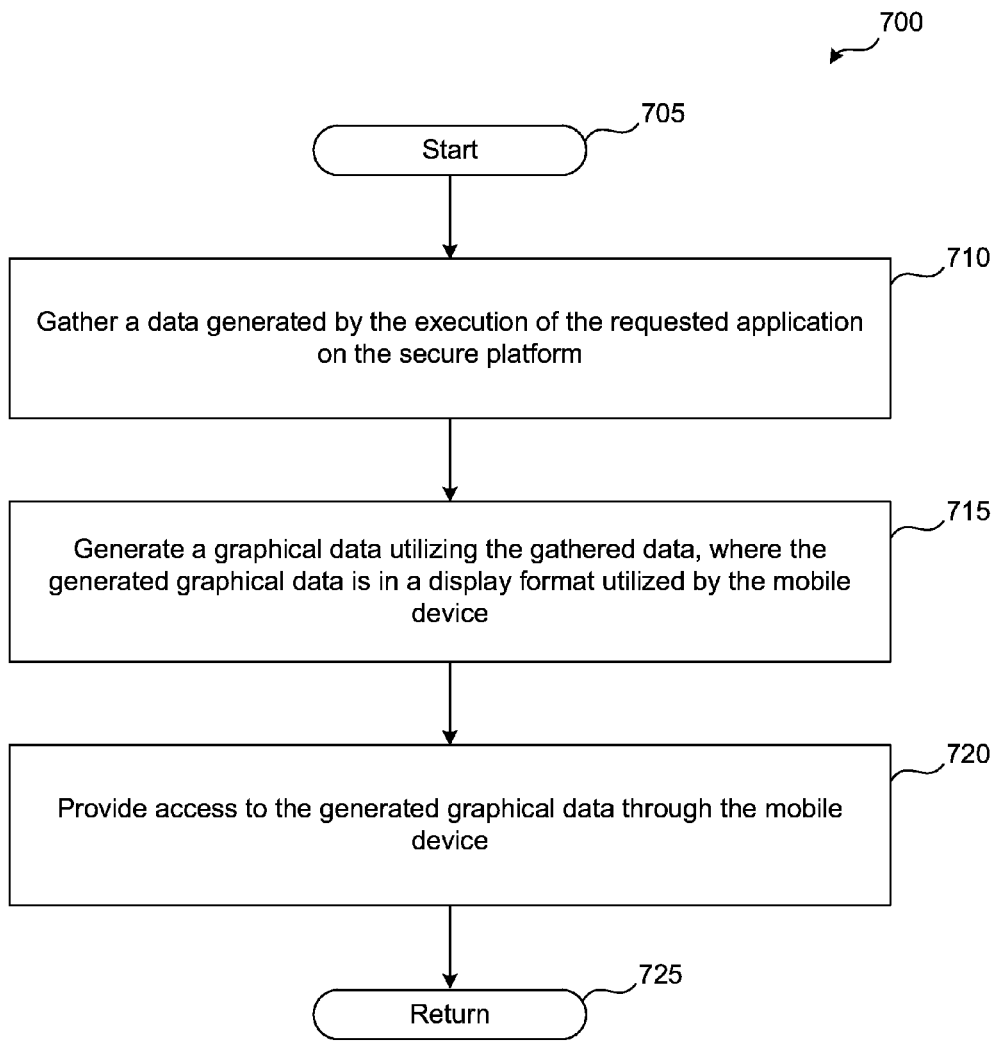
FIG. 7 is a flow chart of an example method for providing access to the requested application executing on the secure computing platform in the distributed processing environment.

Turning now to FIG. 7, FIG. 7 is a flow chart of an example method 700 for providing access to the requested application executing on the secure computing platform in the distributed processing environment 100. In some embodiments, the method 700 is implemented by the TMP 108. The method starts at block 705. At block 710, a data generated by the execution of the requested application on the secure platform is gathered.

At block 715, a graphical data is generated utilizing the gathered data, where the generated graphical data is in a display format utilized by the mobile device. At block 720, access to the generated graphical data is provided through the mobile device 104a-104c, where the provided access includes displaying the generated graphical data through a display screen associated with the mobile device 104a-104c. The method returns at block 725.

Figure 8:
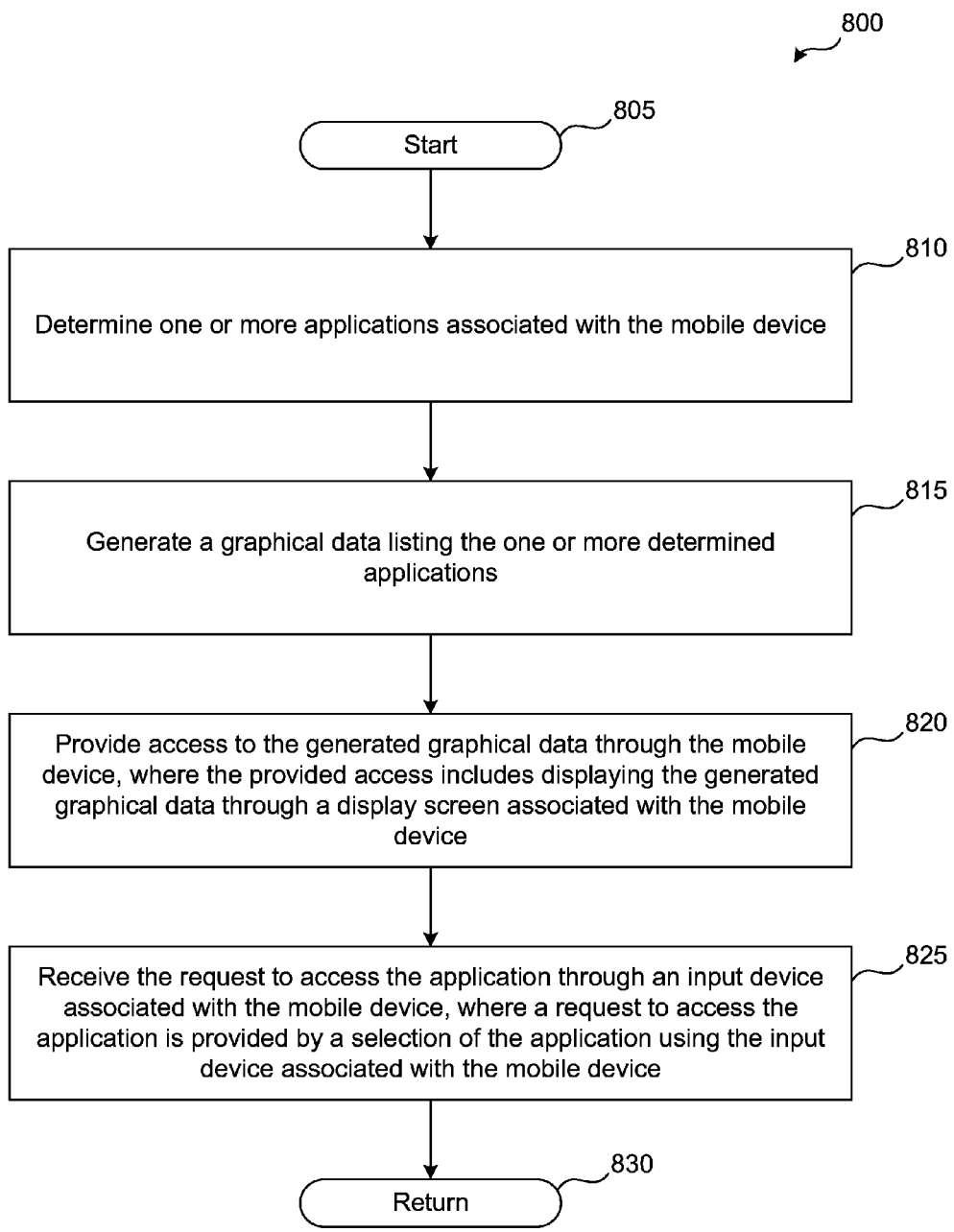
FIG. 8 is a flow chart of an example method for receiving the request to access the application associated with the mobile device in the distributed processing environment.

Turning now to FIG. 8, FIG. 8 is a flow chart of an example method 800 for receiving a request to access the application associated with the mobile device 104a-104c in the distributed processing environment 100, according to some embodiments. In some embodiments, the method 800 is implemented by the TMP 108. The method starts at block 805. At block 810, one or more applications associated with the mobile device 104a-104c are determined. At block 815, a graphical data listing with the one or more determined applications is generated, where the generated graphical data is in a display format utilized by the mobile device 104a-104c.

At block 820, an access to the generated graphical data is provided through the mobile device 104a-104c, where the provided access includes displaying the generated graphical data through a display screen associated with the mobile device 104a-104c. At block 825, the request to access the application through an input device associated with the mobile device 104a-104c is received, where the request to access the application is provided by a selection of the application using the input device associated with the mobile device 104a-104c. The selected application is included in the generated graphical data listing displayed through the display screen associated with the mobile device 104a-104c. The method returns at block 830.

Figure 9:
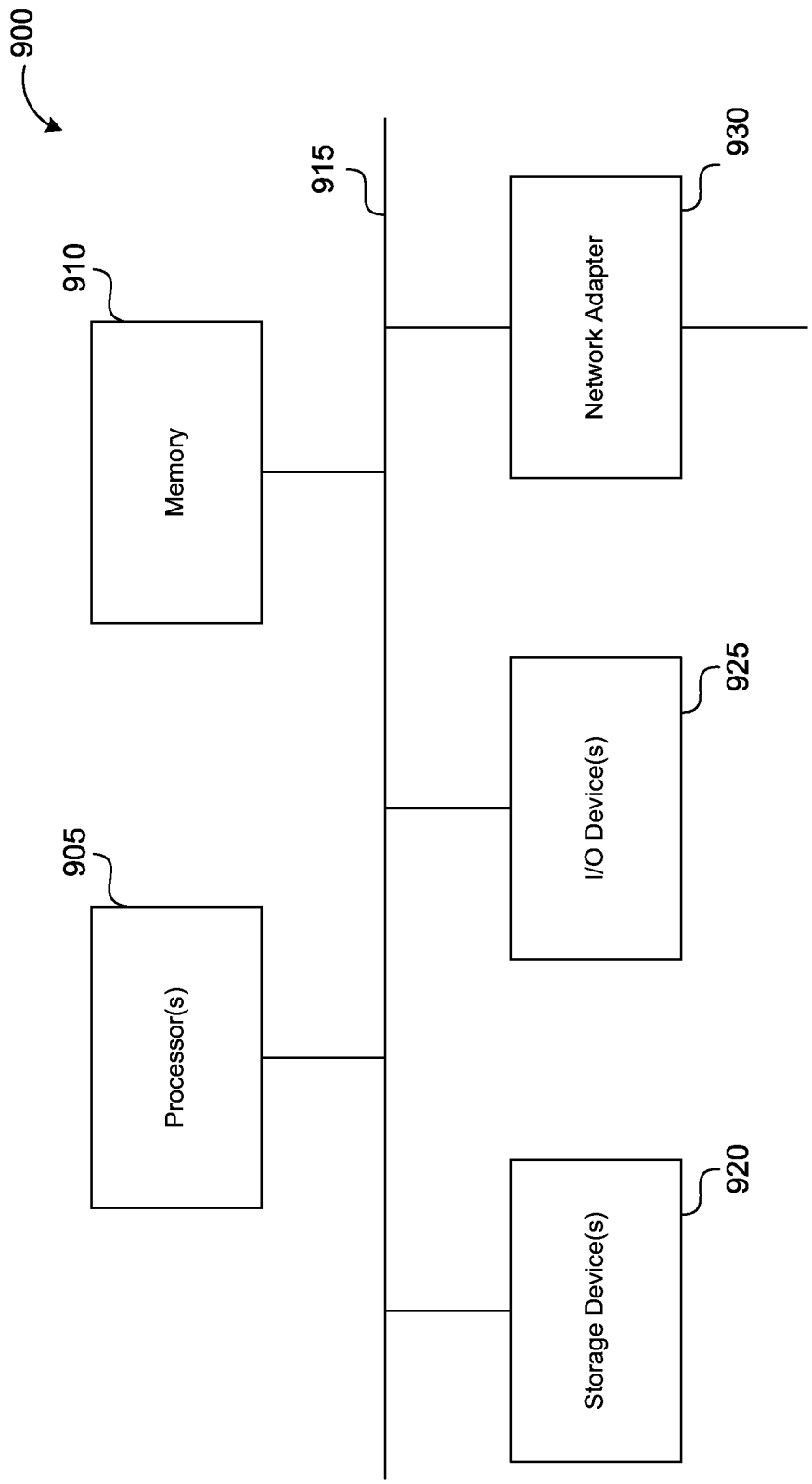
FIG. 9 is a block diagram of a computer system as may be used to implement features of some of the embodiments.

FIG. 9 is a block diagram of a computer system as may be used to implement features of some of the embodiments. The computing system 900 may include one or more central processing units ("processors") 905, memory 910, input/output devices 925 (e.g., keyboard and pointing devices, display devices), storage devices 920 (e.g., disk drives), and network adapters 930 (e.g., network interfaces) that are connected to an interconnect 915. The interconnect 915 is illustrated as an abstraction that represents any one or more separate physical buses, point to point connections, or both connected by appropriate bridges, adapters, or controllers. The interconnect 915, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 910 and storage devices 920 are computer-readable storage media that may store instructions that implement at least portions of the various embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 910 can be implemented as software and/or firmware to program the processor(s) 905 to carry out actions described above. In some embodiments, such software or firmware may be initially provided to the processing system 900 by downloading it from a remote system through the computing system 900 (e.g., via network adapter 930).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A method for preventing an exfiltration, from a secure computing platform, of a data associated with an application of a mobile device, comprising:
    migrating the application from a computing platform of the mobile device to the secure computing platform, wherein the secure computing platform is independent of the computing platform of the mobile device;
    creating a trusted mobile instance on the secure computing platform;
    based on a request received from the mobile device, executing the application on the secure computing platform through said trusted mobile instance, wherein the application is untrusted, the execution of the application comprising generating a trusted first data;
    storing the trusted first data in an encrypted form in a data storage, wherein access to the trusted first data stored in encrypted form in the data storage is restricted to the trusted mobile instance through which the application is executed;
    utilizing said trusted first data, generating graphical data that is indicative of the application executing on the secure computing platform through said trusted mobile instance, wherein said graphical data is in a display format utilized by the mobile device; and
    providing the mobile device an access to the generated graphical data that is indicative of the application executing on the secure computing platform through said trusted mobile instance by streaming using a streaming protocol, as the application is executing through the trusted mobile instance on the secure computing platform, the generated graphical data to the mobile device in an encrypted form for display through a display screen of the mobile device.

2. The method of claim 1, wherein said creating a trusted mobile instance on the secure computing platform comprises creating a trusted mobile instance on the secure computing platform through a kernel service isolation layer ("KSIL") module, the KSIL module being an intermediary layer between a given trusted mobile instance and a kernel module of the secure computing platform, the KSIL module managing one or more service requests from a plurality of trusted mobile instances to the kernel module, wherein the kernel module provides an access to a system resource of the secure computing platform in response to a given service request.

3. The method of claim 1, further comprising:
identifying a second data associated with the requested application in the data storage, the identified second data in the data storage being accessible through the secure computing platform;
gathering the identified second data associated with the requested application; and
executing the requested application on the secure computing platform through the trusted mobile instance, the execution of the requested application utilizing the identified second data associated with the requested application.

4. The method of claim 3, further comprising:
receiving, using said streaming protocol, a user input from a user of the mobile device, the user input being provided using an input device associated with the mobile device;
receiving, using said streaming protocol, sensory input from a sensor associated with the mobile device; and
executing the application utilizing the received user input, the received sensory input, and the identified second data associated with the application.

5. The method of claim 4, wherein the sensor on the mobile device includes any one or more of: a camera; a GPS module; a wireless communication module; a compass; a temperature sensor; a proximity sensor; an accelerometer; and a gyroscope.

6. The method of claim 4, wherein the input device associated with the mobile device includes any one or more of: a keyboard; a microphone; a touchscreen, and a camera.

7. The method of claim 1, wherein receiving the request to access the application associated with the mobile device further comprises:
determining one or more applications associated with the mobile device;
generating a graphical data list of the one or more determined applications, the generated graphical data list being in a display format utilized by the mobile device;
providing an access to the generated graphical data list through the mobile device, wherein the provided access includes displaying the generated graphical data list through a display screen associated with the mobile device; and
receiving the request through an input device associated with the mobile device, wherein a given request to access a given application is provided by a selection of the given application using the input device associated with the mobile device, the given application being included in a given generated graphical data list displayed through the display screen associated with the mobile device.

8. The method of claim 7, wherein the graphical data list of the one or more determined applications is a home screen of the mobile device, the home screen including one or more icons corresponding to the one or more determined applications, wherein the selection of the given application using the input device associated with the mobile device includes selection of an icon associated with the given application using the input device.

9. The method of claim 1, wherein said method further comprises identifying a source of the application and installing the application on the secure computing platform.

10. The method of claim 1, wherein said streaming, using a streaming protocol, comprises streaming using a streaming media protocol.

11. The method of claim 10, wherein said method further comprises proxying a user-interaction with said application using said streaming media protocol.

12. The method of claim 1 further comprising preventing direct access to a resource by the application being executed through the trusted mobile instance.

13. The method of claim 12, wherein said secure computing platform is enabled to access a network and an input device, wherein said preventing direct access to a resource comprises preventing direct access to at least one of said network, said input device, and a resource of said secure computing platform.

14. The method of claim 1, wherein said secure computing platform comprises a memory and a processor, wherein the processor has a CPU, wherein said creating a trusted mobile instance comprises providing memory space in said memory and processing cycles of said CPU.

15. A system comprising:
a processor;
a memory;
a network interface;
a bus coupling the processor, the memory, and the network interface; and at least one component configured to:
migrate an application from a computing platform of a mobile device to a secure computing platform, wherein the secure computing platform is independent of the computing platform of the mobile device;
create a trusted mobile instance on the secure computing platform;
execute the application, based on a request received from the mobile device, on the secure computing platform through the created trusted mobile instance, wherein the application is untrusted;
generate a trusted first data based on execution of said application;
store the trusted first data in an encrypted form in a data storage, wherein access to the trusted first data stored in encrypted form in the data storage is restricted to the trusted mobile instance through which the application is executed; and
utilizing said trusted first data, generate graphical data that is indicative of the application executing on the secure computing platform through said trusted mobile instance, wherein said graphical data is in a display format utilized by the mobile device; and
provide the mobile device an access to the generated graphical data that is indicative of the application executing on the secure computing platform through the trusted mobile instance by streaming, using a streaming protocol, as the application is executing on the secure computing platform through the trusted mobile instance, the generated graphical data in an encrypted form to the mobile device for display through a display screen of the mobile device.

16. The system of claim 15, wherein said at least one component configured to create a trusted mobile instance on the secure computing platform comprises a component configured to create a trusted mobile instance on the secure computing platform through a kernel service isolation layer ("KSIL") module, the KSIL module being an intermediary layer between a given trusted mobile instance and a kernel module of the secure computing platform, the KSIL module managing one or more service requests from a plurality of trusted mobile instances to the kernel module, wherein the kernel module provides an access to a system resource of the secure computing platform in response to a given service request.

17. The system of claim 15, wherein said at least one component further comprises at least one component configured to:
identify a second data associated with the application in the data storage, the identified second data in the data storage being accessible through the secure computing platform;
gather the identified second data associated with the application; and
execute the requested application on the secure computing platform through the trusted mobile instance, the execution of the request application utilizing the identified second data associated with the application.

18. The system of claim 17, wherein said at least one component further comprises at least one component configured to:
receive, using said streaming protocol, a user input from a user of the mobile device, the received user input being provided using an input device associated with the mobile device, the received user input being utilized during the execution of the application;
receive, using said streaming protocol, a sensory input from a sensor on the mobile device, the received sensory input being utilized during the execution of the application; and
execute the application utilizing the received user input, the received sensory input, and the identified second data associated with the application.

19. The system of claim 18, wherein the sensor on the mobile device includes any one or more of: a camera; a GPS module; a wireless communication module; a compass; a temperature sensor; a proximity sensor; an accelerometer; and a gyroscope.

20. The system of claim 18, wherein the input device associated with the mobile device includes any one or more of: a keyboard; a microphone; a touchscreen; and a camera.

21. The system of claim 15, wherein the at least one component configured to receive the request further comprises at least one component configured to:
determine one or more applications associated with the mobile device;
generate a graphical data list the one or more determined applications, the generated graphical data list being in a display format utilized by the mobile device;
provide an access to the generated graphical data list through the mobile device, wherein the provided access includes displaying the generated graphical data list through a display screen associated with the mobile device; and
receive the request through an input device associated with the mobile device, wherein a given request to access a given application is provided by a selection of the given application using the input device associated with the mobile device, the given application being included in a given generated graphical data list displayed through the display screen associated with the mobile device.

22. The system of claim 21, wherein the graphical data list of the one or more determined applications is a home screen of the mobile device, the home screen including one or more icons corresponding to the one or more determined applications, wherein the selection of the given application using the input device associated with the mobile device includes selection of an icon associated with the given application using the input device.

23. The system of claim 15, wherein said at least one component is further configured to identify a source of the application and install the application on the secure computing platform.

24. The system of claim 15, wherein said at least one component to provide access by streaming, using a streaming protocol, comprises a component configured to provide access by streaming using a streaming media protocol.

25. The system of claim 24, wherein said at least one component further comprises at least one component configured to proxy a user-interaction with said application using said streaming media protocol.

26. The system of claim 15, wherein said at least one component is further configured to prevent direct access to a resource by the application being executed through the trusted mobile instance.

27. The system of claim 26, wherein said secure computing platform is enabled to access a network and an input device, wherein said at least one component configured to prevent direct access to a resource comprises a component configured to prevent direct access to at least one of said network, said input device, and a resource of said secure computing platform.

28. The system of claim 15, wherein said secure computing platform comprises a memory and a processor, wherein the processor has a CPU, wherein said at least one component configured to create a trusted mobile instance comprises a component configured to provide memory space in said memory and processing cycles of said CPU.

29. A non-transitory computer readable storage medium storing computer executable instructions, comprising:
instructions for migrating an application from a computing platform of a mobile devise to a secure computing platform, wherein the secure computing platform is independent of the computing platform of the mobile device,
instructions for creating a trusted mobile instance on the secure computing platform;
instructions for executing the application, based on a request received from the mobile device, on the secure computing platform through said trusted mobile instance, wherein the requested application is untrusted, the execution of the requested application comprising generating a trusted first data;
instructions for storing the trusted first data in an encrypted form in a data storage, wherein access to the trusted first data stored in encrypted form in the data storage is restricted to the trusted mobile instance through which the requested application is executed;
instructions for generating, utilizing said trusted first data, graphical data that is indicative of the application executing on the secure computing platform through said trusted mobile instance, wherein said graphical data is in a display format utilized by the mobile device; and
instructions for providing to the mobile device an access to the generated graphical data that is indicative of the application executing on the secure computing platform through the trusted mobile instance by streaming, using a streaming protocol, as the application is executing on the secure computing platform through the trusted mobile instance, the generated graphical data in an encrypted form for display through a display screen of the mobile device.

30. The non-transitory computer readable storage medium of claim 29, wherein the instructions for creating a trusted mobile instance on the secure computing platform comprise instructions for creating a trusted mobile instance on the secure computing platform through a kernel service isolation layer ("KSIL") module, the KSIL module being an intermediary layer between a given trusted mobile instance and a kernel module of the secure computing platform, the KSIL module managing one or more service requests from a plurality of trusted mobile instances to the kernel module, wherein the kernel module provides an access to a system resource of the secure computing platform in response to a given service request.

31. The non-transitory computer readable storage medium of claim 29, further comprising:
instructions for identifying a second data associated with the application in the data storage, the identified second data in the data storage being accessible through the secure computing platform;
instructions for gathering the identified second data associated with the application; and
instructions for executing the requested application on the secure computing platform through the trusted mobile instance, the execution of the requested application utilizing the identified second data associated with the application.

32. The non-transitory computer readable storage medium of claim 31, further comprising:
instructions for receiving, using said streaming protocol, a user input from a user of the mobile device, the received user input being provided using an input device associated with the mobile device, the received user input being utilized during the execution of the application;
instructions for receiving, using said streaming protocol, a sensory input from a sensor on the mobile device, the received sensory input being utilized during the execution of the application; and
instructions for executing the application utilizing the received user input, the received sensory input and the identified second data associated with the application.

33. The non-transitory computer readable storage medium of claim 32, wherein the sensor on the mobile device includes any one or more of: a camera; a GPS module; a wireless communication module; a compass; a temperature sensor; a proximity sensor; an accelerometer; and a gyroscope.

34. The non-transitory computer readable storage medium of claim 32, wherein the input device associated with the mobile device includes any one or more of: a keyboard; a microphone; a touchscreen, and a camera.

35. The non-transitory computer readable storage medium of claim 29, wherein the instructions for receiving the request to access the application associated with the mobile device further comprise:
instructions for determining one or more applications associated with the mobile device;
instructions for generating a graphical data list of the one or more determined applications, the generated graphical data list being in a display format utilized by the mobile device;
instructions for providing an access to the generated graphical data list through the mobile device, wherein the provided access includes displaying the generated graphical data list through a display screen associated with the mobile device; and
instructions for receiving the request through an input device associated with the mobile device, wherein a given request to access a given application is provided by a selection of the given application using the input device associated with the mobile device, the given application being included in a given generated graphical data list displayed through the display screen associated with the mobile device.

36. The non-transitory computer readable storage medium of claim 35, wherein the graphical data list of the one or more determined applications is a home screen of the mobile device, the home screen including one or more icons corresponding to the one or more determined applications, wherein the selection of the given application using the input device associated with the mobile device includes selection of an icon associated with the given application using the input device.

37. The non-transitory computer readable medium of claim 29, wherein said non-transitory computer readable medium further comprises instructions for identifying a source of the application and instructions for installing the application on the secure computing platform.

38. The non-transitory computer readable medium of claim 29, wherein said instructions for providing access by streaming, using a streaming protocol, comprises streaming using a streaming media protocol.

39. The non-transitory computer readable medium of claim 38, wherein said non-transitory computer readable medium further comprises instructions for proxying a user-interaction with said application using said streaming media protocol.

40. The non-transitory computer readable medium of claim 39, wherein said non-transitory computer readable medium further comprises instructions for preventing direct access to a resource by the application executing through the trusted mobile instance.

41. The non-transitory computer readable medium of claim 29, wherein said secure computing platform is enabled to access a network and an input device, wherein said instructions for preventing direct access to a resource comprise instructions for preventing direct access to at least one of said network, said input device, and a resource of said secure computing platform.

42. The non-transitory computer readable medium of claim 29, wherein said secure computing platform comprises a memory and a processor, wherein the processor has a CPU, wherein said instructions for creating a trusted mobile instance comprise instructions for providing memory space in said memory and instructions for providing processing cycles of said CPU.

* * * * *